(12) United States Patent
Wei et al.

(10) Patent No.: US 8,778,147 B2
(45) Date of Patent: *Jul. 15, 2014

(54) METHOD AND TOOL FOR FORMING NON-CIRCULAR HOLES USING A SELECTIVELY COATED ELECTRODE

(75) Inventors: Bin Wei, Mechanicville, NY (US); Ronald Scott Bunker, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1798 days.

This patent is subject to a terminal disclaimer.

(21) Appl. No.: 12/118,791

(22) Filed: May 12, 2008

(65) Prior Publication Data

US 2009/0277803 A1    Nov. 12, 2009

(51) Int. Cl.
*B23H 3/00* (2006.01)
*C25F 3/00* (2006.01)

(52) U.S. Cl.
CPC .... *B23H 3/00* (2013.01); *C25F 3/00* (2013.01)
USPC ....................... 204/224 M; 205/649; 205/656

(58) Field of Classification Search
CPC .................................... B23H 3/00; C25F 3/00
USPC .............................. 205/649, 656; 204/224 M
See application file for complete search history.

(56) References Cited

U.S. PATENT DOCUMENTS

| 6,146,098 | A  | * | 11/2000 | Fukuno et al. | 416/97 R |
| 6,234,752 | B1 |   | 5/2001  | Wei et al.    |          |
| 6,303,193 | B1 |   | 10/2001 | Guida et al.  |          |
| 6,416,283 | B1 | * | 7/2002  | Johnson et al.| 416/97 R |
| 6,644,921 | B2 |   | 11/2003 | Bunker et al. |          |
| 7,938,951 | B2 | * | 5/2011  | Lee et al.    | 205/665  |
| 7,964,087 | B2 | * | 6/2011  | Lee et al.    | 205/665  |
| 2003/0006137 | A1 | * | 1/2003 | Wei et al.   | 204/280  |
| 2008/0230378 | A1 | * | 9/2008 | Lee et al.   | 204/290.01 |
| 2008/0230379 | A1 | * | 9/2008 | Lee et al.   | 204/290.01 |

\* cited by examiner

*Primary Examiner* — Paul Hyun
(74) *Attorney, Agent, or Firm* — Ann M. Agosti

(57) ABSTRACT

An electrochemical machining process for forming a non-circular hole from a substantially circular hole within a workpiece using an electrode. The electrode is made of an electrically conductive material and has insulated areas in which the electrically conductive material is coated with an insulating material, and exposed areas of metal or conductive material. The insulated areas and exposed areas extending in rows substantially along a longitudinal axis of the electrode. The electrode is first positioned in a substantially circular hole. An electric current is then applied to the electrode to electrochemically remove a predetermined amount of material from the substantially circular hole to form a non-circular hole. A variety of different non-circular shapes are achievable using the process.

7 Claims, 3 Drawing Sheets

METHOD AND TOOL FOR FORMING NON-CIRCULAR HOLES USING A SELECTIVELY COATED ELECTRODE

BACKGROUND

The invention relates to a tool and a method used in electrochemical machining. More particularly, the invention relates to a tool and method for forming non-circular holes from pre-formed circular holes by selectively removing insulating material on the surface of the tool.

A specialized adaptation of electrochemical machining, known as shaped-tube electrochemical machining (STEM), is used for drilling small, deep holes in electrically conductive materials. STEM is a noncontact electrochemical drilling process which can produce holes with aspect ratios as high as 300:1. It is the only known method which is capable of manufacturing the small, deep holes used for cooling blades of efficient gas turbines.

The efficiency of a gas turbine engine is directly proportional to the temperature of turbine gases channeled from the combustor of the engine and flowing over the turbine blades. For example, for gas turbine engines having relatively large blades, turbine gas temperatures approaching 1500° C. (2700° F.) are typical. To withstand such high temperatures, these large blades are manufactured from advanced materials and typically include state-of-the-art type cooling features.

A turbine blade is typically cooled using a coolant such as compressor discharge air. The blade typically includes a cooling hole through which the air passes. A further design advancement has been the addition of internal ridges in the cooling hole to effect turbulent flow through the hole and increase cooling efficiency. Cooling features within the hole such as turbulence promoting ribs, or turbulators, thus increase the efficiency of the turbine.

The cooling holes commonly have an aspect ratio, or depth to diameter ratio, as large as 300:1, with a diameter as small as a few millimeters. The turbulators extend from sidewalls of the hole into the air passage about 0.2 millimeters (mm), for example.

One method currently used for drilling the cooling holes in turbine blades is a shaped-tube electrochemical machining (STEM) process. In this process, an electrically conductive workpiece is situated in a fixed position relative to a movable manifold. The manifold supports a plurality of drilling tubes, each of which are utilized to form an aperture in the workpiece. The drilling tubes function as cathodes in the electrochemical machining process, while the workpiece acts as the anode. As the workpiece is flooded with an electrolyte solution from the drilling tubes, material is depleted from the workpiece in the vicinity of the leading edge of the drilling tubes to form substantially straight-walled (circular) holes.

Turbulated ridges are formed in the cooling holes by a modification of the standard shaped-tube electrochemical machining (STEM) process for drilling substantially straight-walled (circular) holes. One common method is termed cyclic dwelling. With this technique, the drilling tube is first fed forward, and then the advance is slowed or stopped in a cyclic manner. The dwelling of the tool which occurs when the feed rate is decreased or stopped creates a local enlargement of the hole diameter, or a bulb. The cyclic dwelling causes ridges to be formed between axially spaced bulbs. Cyclical voltage changes may be required. These ridges are the turbulators.

The cyclic dwelling method is very low in process efficiency compared to shaped-tube electrochemical machining (STEM) drilling of substantially straight-walled holes because of the long time required for drilling each bulb individually by cyclic tool dwelling. The dwell time required to form a single bulb can be greater than the time for drilling an entire substantially straight-walled hole.

To alleviate the problems associated with the cyclic dwelling method using the STEM method, another method known as pulsed electrochemical machining (PECM) positions an electrode comprising a hollow electrically conductive cylinder coated with an electrically insulating coating in a pattern into the substantially straight-walled hole. The pattern on the electrode is a series of rings that defines raised areas or ridges to be machined in the substantially straight-walled hole. The exposed conductive material on the surface of the electrode defines areas where bulbs are formed by removal of metal from the wall of the pre-formed hole. The raised areas or ridges are created in the wall of the pre-formed hole where no depleting occurs in the vicinity of the insulated portions of the surface of the electrode. These ridges are the turbulators.

However, all the above methods are directed to producing raised areas or ridges, which are the turbulators, in a pre-formed, substantially straight-walled (circular) hole. None of the above methods are directed to producing a non-circular hole from the pre-formed, substantially straight-walled (circular) hole. Accordingly, there is a need in the art for a new and improved method for manufacturing a non-circular hole from a pre-formed, substantially straight-walled hole.

BRIEF DESCRIPTION

Briefly, an electrochemical machining process for forming a non-circular hole from a pre-formed, substantially straight-walled hole within a workpiece using an electrode, the electrode made of an electrically conductive material and having insulated areas in which the electrically conductive material is coated with an insulating material and exposed areas in which the electrically conductive material is exposed, the insulated areas and exposed areas extending substantially along a longitudinal axis of the electrode, the method comprises the steps of:

positioning the electrode in a substantially circular hole; and applying an electric current to the electrode to electrochemically remove a predetermined amount of material from the substantially circular hole to form a non-circular hole.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
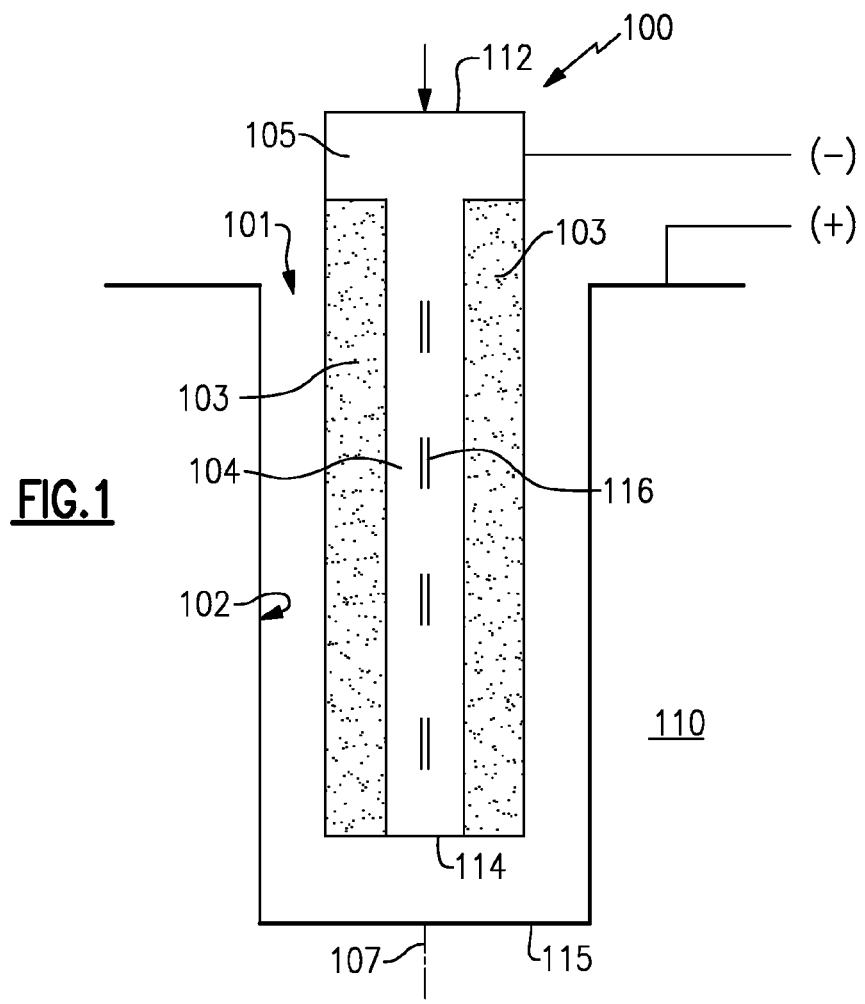
FIG. 1 is a schematic representation of an electrode including an electrically conductive cylinder having an insulating surface coating in a pattern designed to form a non-circular hole in a pre-formed, substantially straight-walled hole according to an embodiment of the invention.
Figure 2:
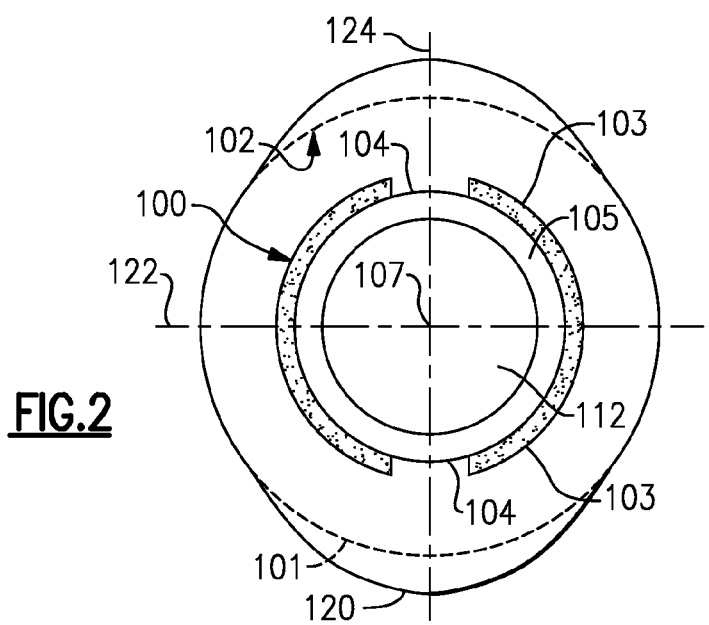
FIG. 2 is a schematic representation of the pre-formed, substantially straight-walled hole after the non-circular hole has been formed with the electrode of the invention.

Referring to the drawings wherein identical reference numerals denote the same elements throughout the various views, FIG. 1 depicts an electrode 100 of the invention positioned in a circular hole 101 with a substantially straight wall 102 of an electrically conductive workpiece 110. The circular hole 101 can be produced using any known process, such as STEM, casting, and the like. FIG. 2 shows the electrode 100 of the invention after a non-circular hole 120 has been created from the circular hole 101. In the illustrated embodiment, the circular hole 101 has a substantially straight wall 102. However, the invention can be practiced by using the electrode 100 in a circular hole that does not have substantially straight walls. For example, the hole 101 can be circular, but the walls may have turbulators, such as ridges, and the like, formed thereon.

In the embodiments shown in FIGS. 1 and 2, the electrode 100 comprises a hollow cylinder 105 made of an electrically conductive metal or conductive material 104. The cylinder 105 has insulated areas in which the metal or conductive material 104 is coated with an electrically insulating coating 103 on the exterior surface of electrode 100, and exposed areas in which the metal or conductive material 104 is not coated with the insulating coating 103. In the illustrated embodiment, the insulating coating 103 is formed in two substantially parallel rows along a longitudinal axis 107 of the electrode 100 on opposite sides of the electrode 100 that are approximately 180 degrees apart from each other. In addition, the insulating coating 103 is removed from the exterior surface of the electrode 100 to form the exposed areas of metal or conductive material 104 in two substantially parallel rows from opposite sides of the electrode 100 that are approximately 180 degrees apart from each other. Because the metal or conductive material 104 is exposed, the exposed or conductive material 104 causes deplating to occur in the vicinity of the area of the exposed or conductive metal 104. Conversely, no significant deplating occurs on the other opposite sides of the electrode 100 in which the insulating coating 103 remains on the surface of the electrode 100. The (+) and (−) designations indicate pulsed voltage through the body of the electrode 100 and the workpiece 110. This process is better understood with reference to commonly assigned U.S. Pat. No. 6,303,193 entitled "Process for Fabricating a tool used in Electrochemical Machining," U.S. Pat. No. 6,290,461 entitled "Method and Tool for Electrochemical Machining," U.S. Pat. No. 6,200,429 entitled "Method and Tool for Electrochemical Machining," U.S. Pat. No. 6,267,868 entitled "Method and Tool for Electrochemical Machining," and U.S. Pat. No. 6,234,752 entitled "Method and Tool for Electrochemical Machining."

As shown in FIG. 2, areas of exposed conductive material 104 on the surface of electrode 100 define areas where material is removed from the wall 102 of the circular hole 101. On the other hand, no material is removed from the wall 102 of the circular hole 101 in the vicinity of insulated coating 103 of the surface of the electrode 100.

The body of the electrode 100 is composed of an electrically conductive material, preferably titanium because of titanium's resistance to electrolyte corrosion. The outer surface of the electrode body is covered with an electrically insulating coating 103 in a pattern that leaves some areas of the surface exposing the conductive material of the body. The coating 103 is made of a dielectric material, which dielectric material should preferably be smooth, of even thickness, tightly adhered to the surface of the body and free of pinholes or foreign material. Exemplary dielectric materials suitable for electrode 100 of the present invention include polyethylene, polytetrafluoro-ethylene, ceramics, and rubbers.

The diameter of the hollow cylinder 105 may be as small or as large as necessary to fit the circular hole 101. In one embodiment, for example, the outside diameter of cylinder 105, measured over the coated surface, ranges from about 0.04-0.3 inches with the thickness of insulating coating 103 being about 0.15-0.2 mm thick.

The hollow cylinder 105 allows for pumping of electrolyte solution into the pre-formed circular hole 101 through an inlet 112 at an end of the electrode 100 extending outside the hole 101 and out of an end hole 114 at the other end of the electrode 100. The inlet 112 and the end hole 114 facilitate uniform electrolyte flow through the areas being machined. The electrode 100 may also have optional electrolyte outlets 116 along the insulating coating 106 of the electrode 100. The outlets 116, in addition to the end hole 114, may be desirable where a relatively large non-circular hole 120 is to be being machined. The size of the outlets 116 and/or the portions of the cylinder 105 not covered by the insulating coating 103 determines the amount of electrolyte supplied to the machining areas, which in turn determines the surface quality of the non-circular hole 120, as well as uniformity of removal of portions of the workpiece 110.

The electrode 100 may include an optional locator (not shown). The function of the locator is to properly position the electrode 100 in hole 101 such that the electrode 100 is coaxial with the walls 102 of the hole 101. In one embodiment, the locator may comprise the same material(s) as the insulating coating 103. The outside diameter of the locator may be less than the inside diameter of the hole 101 and is sufficiently small so that the electrode 100 may be easily inserted into the hole 101, but sufficiently large so that the locator fits snugly therein. The locator may have a coating of greater thickness compared to the coating on other parts of the electrode 100. For example, the thickness of the insulating coating 103 may range from about 100-150 micrometers, while the locator may have a thickness ranging from about 200-300 micrometers.

The operation of a shaped-tube electrochemical machining (STEM) instrument or a pulse electrochemical machining (PECM) instrument with acid electrolyte with the electrode of the invention is similar to that with a conventional electrode. Current is provided by coupling the electrode 100 to a negative terminal of a power supply (not shown) and the workpiece 110 to a positive terminal. The electrode 100 is positioned inside smooth-walled hole 101 obtained from a previous drilling step. The circular hole 101 can be formed by any conventional means, such as STEM drilling, casting, and the like. An electrolyte solution, which solution may be the same electrolyte as used in the first drilling step (if STEM drilling is used), is pumped into an end of hole 101 under pressure. Where the electrode 100 is hollow and may contain outlets 116 for the electrolyte, the solution is pumped into inlet 112 of electrode 100. Solid electrodes can also be utilized. When a solid electrolyte is utilized, electrolyte flows over the space between the outer surface of the solid electrode and the pre-formed hole.

Figure 3:
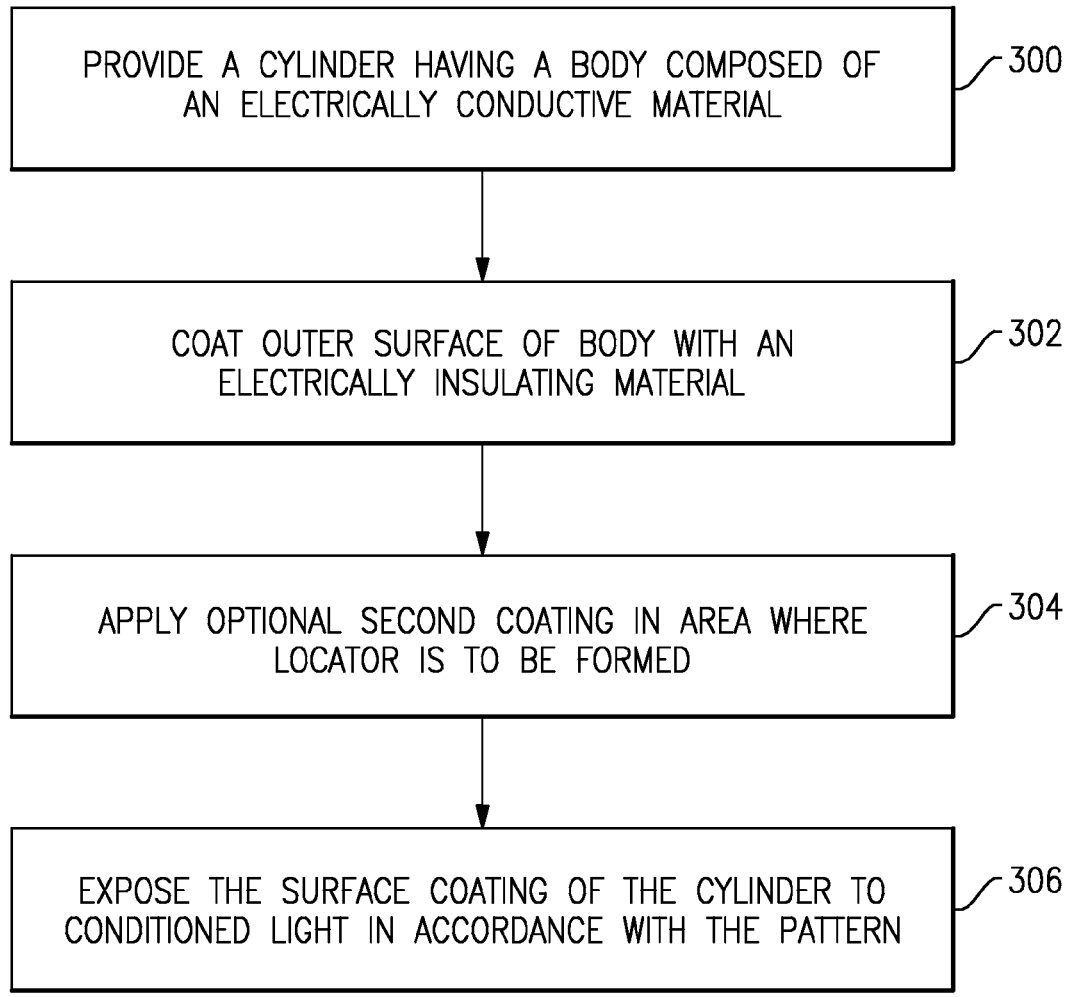
FIG. 3 is a flowchart illustrating a sequence of process steps for forming the electrode of the invention.
Figure 4:
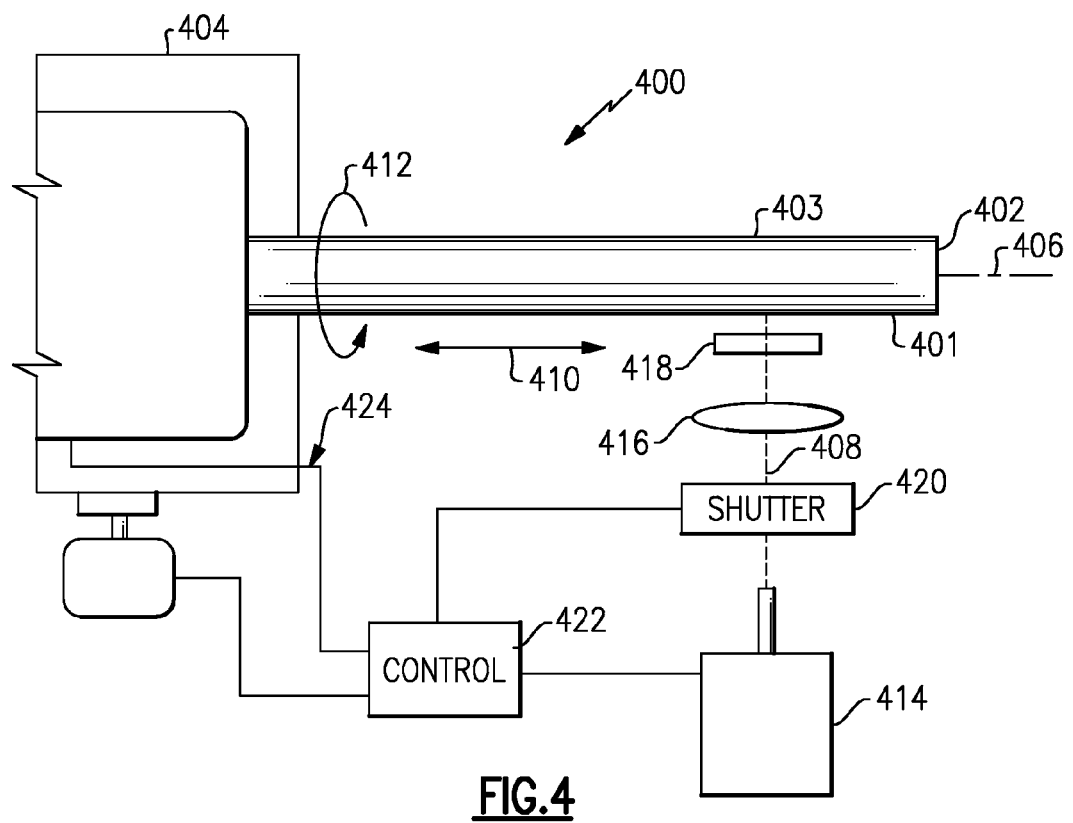
FIG. 4 is a schematic representation of an exemplary apparatus for practicing the process of forming the electrode of the invention.

In accordance with the invention, electrode 100 is manufactured by selectively removing portions of insulating coating 103 to form the desired pattern by exposing the insulating coating to collimated light (shown as light beam 408 in FIG. 4). The process is illustrated in the flow diagram in FIG. 3 and the schematic representation of FIG. 4.

At step 300, a cylinder 402 is provided with a body comprising an electrically conductive material which may be solid or hollow. Titanium metal is preferred for the body of the cylinder 402 because titanium is resistant to electrolytic action. The cylinder 402 may be formed by extrusion or any other known technique. The outer surface of the cylinder 402 is then coated with an electrically insulating coating 403 at step 302, which may be applied by spray or dip coating or any other known technique. The insulating coating 403 is preferably smooth, of even thickness, tightly adhered to the cylinder 402, and free of pinholes or foreign material. In addition to possessing these properties, the insulating coating 403 should be resistant to attack by the electrolyte solutions used in the electrochemical machining process, typically at elevated temperature. For example, the electrolyte may be applied to the cylinder 402 at temperatures ranging from about 18° C. to about 32° C. The electrolyte is usually an aqueous acid. Exemplary acids used in an electrolyte solution for an electrochemical machining instrument are nitric acid, sulfuric acid, hydrochloric acid, and mixtures thereof, at a concentration of about 16-18% by volume. Exemplary electrically insulating or dielectric materials suitable for the insulating coating 403 of the invention include, but are not limited to, polyethylene, polytetrafluoroethylene, ceramics, and rubbers.

At optional step 304, the optional locator 118 (shown in FIG. 1) can be formed, for example, by selectively applying a second coating of insulating material to an area by spraying or dip coating or any other of conventional coating method. The locator 118 may have the same composition as the insulating coating 403, or may have a different composition. It is desirable that the locator 118 include a material which is resistant to the electrolyte solution and that adhesion between the coating 403 and the locator 118 to be sufficient to withstand exposure to the electrolyte solution under operating conditions without delaminating.

At step 306, a desired pattern is then formed in insulating coating 403 by exposing insulating coating 403 to collimated light (shown as light beam 408 in FIG. 4). The pattern is defined by two, substantially parallel, alternating rows 122 (FIG. 2) of insulating coating 403 and the underlying electrically conductive cylinder 402 along the longitudinal axis 406. In the illustrated embodiment, the two, substantially parallel rows of the insulating coating 403 define the minor axis 122 of the non-circular hole 120, and the two rows of the underlying electrically conductive cylinder 402 define the major axis 124 of the non-circular hole 120. However, it will be appreciated that the principles of the invention can be used to produce a non-circular hole with other geometrical shapes, such as square, and the like.

Exemplary apparatus 400 shown in FIG. 4 may be used in patterning step 306 of the electrode fabricating process of the invention. Referring to FIG. 4, the apparatus 400 includes an electrode 401 including electrically conductive cylinder 402 with electrically insulating coating 403 which may be mounted on a computer numerically controlled (CNC) manipulator 404 for rotation about and/or translation along a longitudinal axis 406 relative to beam 408 of collimated light in order to scan or pass light beam 408 over insulating coating 403. The manipulator 404 includes a fixture for holding cylinder 402 for translation under light beam 408 parallel to longitudinal axis 406 along scanning direction 410 as illustrated by the double headed arrow in FIG. 4 and for rotation about longitudinal axis 406 as illustrated by arrow 412.

A source 414 of collimated light, which may comprise a laser or another collimated light source, is positioned so that light beam 408 is directed to cylinder 402. A focusing objective 416 can be adjusted to focus the light beam 408 on the insulating coating 403 of the cylinder 402. A pattern is chosen and a variable aperture 418 is adjusted to narrow the light beam 408 to the desired dimensions. The geometric shape and dimensions of the beam 408 are defined by the variable aperture 418. A shutter 420 may be used to interrupt the beam 408. The apparatus 400 may be operated by a control unit 422, or may be manually operated. A drive 424 associated with manipulator 404 rotates and translates cylinder 402 in a controlled manner to cause light beam 408 to trace a desired pattern on the insulating coating 403. The light beam 408 may be interrupted by a shutter 420 or by turning off the laser power at those times when it is desired to skip from one point to another without removing the insulating coating 403 therebetween.

In one embodiment, direct writing can be used for patterning by shaping the light beam 408 to expose selected areas of the insulating coating 403 to form the desired pattern. Methods of direct writing include using a single beam, using a multiple beam, and using a surrounding beam, for example. Several alternative types of direct writing can be used. For example, cylinder 402 may be mounted in a device, (not shown) similar to one used for laser wire stripping, and having one or more mirrors positioned so as that the reflected beam may impinge on all selected areas of the surface coating simultaneously. Rotation or translation of the cylinder 402 may not be required when such a device is employed. As another example, the apparatus 400 may include a holographic lens (not shown) which causes the beam of light to be spread in a predetermined pattern along the longitudinal axis 406 of the cylinder 402. The need for translation of the cylinder 402 may be avoided by using such a lens, or one which produces similar spreading of the beam.

Figure 5:
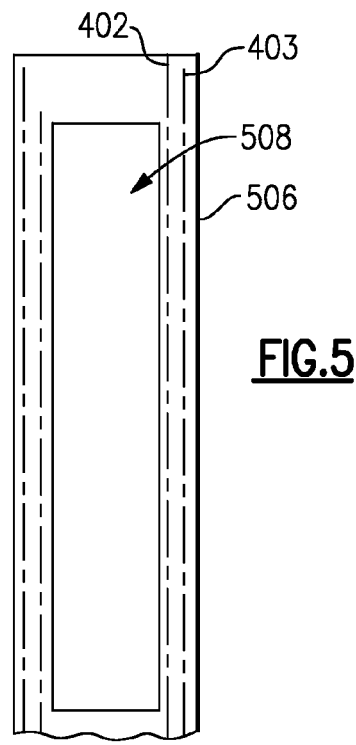
FIG. 5 is an elevation view of an electrically conductive cylinder, an insulating surface coating over the electrically conductive cylinder, and a photomask for protecting the portions of the coating to be left on the cylinder.

As another alternative, a photomask may be applied to insulating coating 403 before mounting the cylinder 402 in the manipulator 404, and the exposure may be done through the photomask, if desired. FIG. 5 illustrates the cylinder 402, the insulating coating 403, and a photomask 506 which defines an area 508 of the insulating coating 403 to be irradiated and protects the remainder of the insulating coating 403 which is to be left on the cylinder 402. The photomask 506 should therefore be opaque to be irradiated to the wavelength of light used for the exposure. The photomask 506 may be conformal or nonconformal. An example of a conformal photomask is a concentric cylinder surrounding the cylinder 402 and the insulating coating 403. An exemplary nonconformal photomask is a flat sheet of metal or glass. In one embodiment, the photomask 506 comprises a commercially available combination of transparent glass with an opaque pattern. In another embodiment, the photomask 506 comprises a metal foil stencil.

Regardless of which of the above techniques is selected for patterning, the light beam 408 is preferably scanned across insulating coating 403 in a scanning direction 410 that is substantially perpendicular to the direction of the light beam 408 to provide substantially complete coverage according to the desired pattern.

In one embodiment, step 306 of exposing the insulated coating 403 to the light beam 408 comprises scanning a light beam 408 from a light source 414 comprising a laser across insulating coating 403 with the exposure resulting in ablation of the coating in accordance with a desired pattern. Ablation refers to a physical and chemical process of material removal which may include a combination of melting, vaporization, sublimation, or high temperature chemical reactions, among other processes.

When the light source 414 comprises a laser, the light beam 408 may be conditioned to selectively ablate the insulating coating 403 and/or the underlying metal of the cylinder 402. Conditioning refers to the process of selecting an appropriate the light source 414 having the properties necessary to effect selective exposure of the insulating coating 403 and setting the necessary parameters in order that the desired pattern is produced. These properties include wavelength, power, fluence and geometrical shape. The wavelength of the light should match the absorption of the material exposed. For example, most polymers absorb light of 248 nanometers (nm), and a laser having light of wavelength 248 nm is capable of ablating most polymers. The power should be sufficient to form the pattern. Fluence is defined as the intensity of the beam, or energy of the beam per unit area. Geometrical shape refers to the cross-sectional shape of the beam and determines the two-dimensional shape of the area of exposed material.

The insulating coating 403 which is to be subjected to ablation may comprise any material which is electrically insulating, resistant to attack by the electrolyte, and which absorbs light of the same wavelength as the light source. When the light source 414 comprises a pulsed excimer laser, such lasers typically emit a beam at 193 nm, 248 nm or 308 nm. Other types of lasers, such as $CO_2$ or YAG may also be used. In this respect, an excimer laser which emits a beam at 248 nm is particularly suitable for use with the method of the invention, as most polymeric materials which are useful as coatings absorb at that wavelength.

A fixed laser pulse of sufficient fluence results in the ablation of a fixed quantity of material from the insulating coating 403. Each pulse to which the insulating coating 403 is exposed ablates the same quantity of material for a uniform coating. Therefore, the amount of material removed, and ultimately, the thickness of the remaining coating is determined by the number of pulses to which the insulating coating 403 is exposed. For an organic polymer coating, about 0.3 to about 0.4 micrometers per pulse are typically removed, although the amount of removal may vary with different coatings, different compositions of the coating, depth of the coating, and type of laser and conditioning of the beam.

In addition to being used for patterning insulating coating 403, light source 414 and the embodiment of FIG. 4 can be used to form and/or pattern the locator 118 of FIG. 1. In an embodiment wherein the locator 118 was formed by applying a coating of insulating material over insulating coating 103, a pattern for the locator may be selected, and a laser beam appropriately conditioned to remove predetermined sections of material of the locator 118 to produce a patterned locator. For example, a three-armed locator 118 at an end of cylinder 402 may be formed by dipping cylinder 402 in a solution or dispersion of a suitable coating material, before or after a pattern is formed on the insulating coating 403 and drying the coating material. After the coating material is set, the cylinder may be exposed to a conditioned laser such that the coating is selectively ablated in the areas 617 in a pattern to form the locator 118 with arms. Typically, at least the insulating coating 403 will remain on the cylinder 402 to insulate the cylinder and prevent metal deplating in that area. In another embodiment, the entire surface of the cylinder 402 can be coated with an insulating coating layer sufficiently thick to form the locator 118 with the laser additionally being used to reduce the thickness of the insulating coating 403 in areas where the locator 118 will not be positioned.

Likewise, the outlets 116 (FIG. 1) for the electrolyte solution may be formed in the body of the cylinder 402 by exposure to the light source 414, such as a laser. As an example, the cylinder 402 and the insulating coating 403 may be exposed to a laser beam conditioned to remove first the insulating coating 403 where it is desired to form an outlet and then perforate the underlying metal of the body. Using this method, an opening is formed in the body of the cylinder which may function as an outlet for the electrolyte solution. An alternative to using the light source 414 to form the outlets 116 is to use, for example, an electrical discharge machine.

As an alternative to direct laser ablation, the light source 414 may be used to selectively expose the insulating coating 403 comprising a photosensitive material. Several classes of photosensitive, electrically insulating materials that are stable to the acid electrolyte used in the electrochemical machining process are commercially available and may be used as the insulating coating 403. These materials include, but are not limited to, pre-imidized and precursor polyimide resins, B-staged bisbenzocyclobutene (BCB) and photosensitive epoxy-based resins. The materials may be applied by spray coating or dip coating, followed by an optional low temperature bake to remove solvent.

Either direct laser writing or a photomask process may be applied to the insulating coating 403, with the light beam 408 then being used to produce a pattern of exposed material in insulating coating 403. The insulating coating 403 may then be developed in a suitable developer to remove the insulating coating 403 in predetermined areas to thereby reveal the underlying electrically conductive cylinder 402. This process may use either positive acting photosensitive materials, in which material is removed during development in areas exposed to light, or negative acting photosensitive material, in which material is removed during development from areas which were not exposed to light. Developers for both positive and negative processes are well known in the art. It will be appreciated that various means of scanning a beam of light across the surface of the cylinder are contemplated, including holding the cylinder stationary while translating the light source.

As described above, the electrode 100 of the invention produces a non-circular hole in the shape of an ellipse having a minor axis and a major axis. However, it will be appreciated that the invention is not limited by the particular shape of the non-circular hole that can be produced by the electrode 100 of the invention, and that any non-circular hole shape can be produced, either in a single step or in multiple steps. For example, the elliptic shape would be a single step by exposing a stripe of electrode down two sides of the electrode. If only one side of the electrode were exposed, then an obloid shape would result, and this may be what is required in some applications. Changing the width of the exposed stripe, or perhaps even making adjacent smaller stripes, would result in differing widths and depths of the shaping on one or more regions of the electrode. A four-lobed pattern would yield a cloverleaf shaped channel.

In addition, the principles of the invention can be applied to the use of multiple electrodes with differing patterns. This would help to shape passages, such as a rectangular shape, where a single electrode would have difficulty starting from the round shape. An electrode pattern also need not be straight along the axis of the circular hole. If the exposed stripe were curved down the length, this would accommodate the stacking orientation, or twist, of the airfoil. This is desirable for airfoils, and can be done by the pulsed ECM method. And just to be complete, an electrode could be used in one orientation, and then rotated in the same hole and used again to redefine the shape.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A shaped-tube electrochemical machining (STEM) process for forming a non-circular hole from a substantially circular hole within a workpiece using an electrode, the electrode made of an electrically conductive material and having insulated areas in which the electrically conductive material is coated with an insulating material and exposed areas of metal or conductive material, the insulated areas and exposed areas extending substantially along a longitudinal axis of the electrode, the method comprising the steps of:

positioning the electrode in a substantially circular hole; and applying an electric current to the electrode to electrochemically remove a predetermined amount of material from the substantially circular hole to form a non-circular hole in the shape of an ellipse having a major axis and a minor axis.

2. The process of claim 1, wherein the exposed areas of the electrode form the major axis of the elliptical hole, and wherein the insulated areas of the electrode form the minor axis of the elliptical hole.

3. A process according to claim 1, further comprising the step of positioning the electrode in the center of the substantially circular hole.

4. A process according to claim 1, further comprising the step of passing an electrolyte solution through the electrode.

5. A process according to claim 1, wherein the workpiece comprises a turbine blade.

6. A process according to claim 1, further comprising the step of flushing a gap between the electrode and the workpiece with an electrolyte.

7. A process according to claim 1, wherein the non-circular hole has a depth to diameter ratio of up to 300:1.

\* \* \* \* \*